United States Patent [19]

Kawasaki et al.

[11] 4,197,327

[45] Apr. 8, 1980

[54] PROCESS FOR MANUFACTURING MEAT-LIKE BLOCK OR SHEET OF PROTEIN FIBERS

[75] Inventors: Yoichi Kawasaki; Yukiomi Yamato, both of Osaka, Japan

[73] Assignee: Fuji Oil Co., Ltd., Japan

[21] Appl. No.: 940,511

[22] Filed: Sep. 5, 1978

[30] Foreign Application Priority Data

Sep. 10, 1977 [JP] Japan ................. 52-109283

[51] Int. Cl.$^2$ .............................................. A23P 1/00
[52] U.S. Cl. ...................................... 426/515; 426/520; 426/656; 426/657; 426/802
[58] Field of Search ............... 426/276, 656, 657, 802, 426/515, 520; 260/112 R; 264/202

[56] References Cited

U.S. PATENT DOCUMENTS

| 3,662,671 | 5/1972 | Frederiksen et al. ........... 426/802 X |
| 3,794,731 | 2/1974 | Dannert et al. ................. 426/802 X |
| 3,891,777 | 6/1975 | Boyer ................................. 426/656 X |
| 4,017,646 | 4/1977 | Hoer et al. ........................... 426/656 |

*Primary Examiner*—Arthur L. Corbin
*Attorney, Agent, or Firm*—Wenderoth, Lind & Ponack

[57] ABSTRACT

A process for manufacturing a meat-like block or sheet of protein fibers in which a coagulable protein slurry, having an optimum pH approximately equivalent to the specific isoelectric point thereof, is forced to flow in a heated condition and is subsequently sprayed in an atomized condition onto a travelling, water drainable receiver within a short period of time before a specific coagulation thereof is completed. By processing as mentioned above, meat-like blocks of protein fibers can be manufactured in one operation without acidifying the protein slurry or adding a binding agent.

8 Claims, No Drawings

PROCESS FOR MANUFACTURING MEAT-LIKE BLOCK OR SHEET OF PROTEIN FIBERS

BACKGROUND OF THE INVENTION

This invention relates to a process for manufacturing an edible, simulated meat product, and more particularly, to a process for manufacturing a meat-like lump, sheet or block of protein fibers.

Conventionally, many process methods for manufacturing an edible, metal-like food material through processing edible protein source materials have been proposed.

Although a wet spinning method, in which a protein-containing alkaline dope prepared from highly purified protein is forced through a spinneret into an acid coagulating bath for coagulation thereof, may be typical, the resultant independent fibers hardly provide a specific meat-like sensation to the mouth. Therefore, the fibers thus processed are generally further introduced into a drawing or stretching step and then into an immersing step with binders such as albumin or the like so that the resultant fibers are arranged to be layered as tows of fibers.

However, owing to the necessity for the preparation of the highly purified protein as well as problems associated with the waste liquid treatments resulting from the broad pH range involved, the known wet spinning method is usually expensive to operate.

According to another typical method for manufacturing the protein fibers, a protein slurry adjusted for pH is simultaneously forced to flow and is heated by means of a heat exchanger of the tubular type or ejector to allow the substance to be formed in an apparently fibrous coagulation. However, the resultant protein fibers obtained by the method as described above and showing a fibril structure (i.e., branched structure) cannot be towed at all due to the specific randomly oriented and noncontinuous, structural characteristics thereof.

For the formation of the meat-like protein fibers as described above (including those in the form of tows) into a meat-like lump or block, it has been a general practice to mix such protein fibers with a binding material so as to be molded for subsequent heating and solidification, with the process for the fiber formation being completely separate from the process for lump or block formation. The processes for fabricating the meat-like sheet or block of protein fibers from the edible protein source materials, comprises a first step for processing protein fibers, and a successive step for fabricating these protein fibers into the sheet or block form as described above, in which the two steps are independently necessary and must be performed in succession.

A protein fiber fabrication process disclosed, for example, in U.S. Pat. No. 3,794,731 (Patented Feb. 26, 1974) comprises a procedure of forcing an aqueous alkaline protein solution through an orifice and simultaneously intimately containing the protein stream with a stream of a fast acting acid gas in an amount sufficient to coagulate the protein and form the protein fibers with said gas travelling at a velocity greater than the protein stream. Additionally, the prior art mentioned above further indicates a possibility of constructing a composite mat of protein fibers in one operation, wherein the fibers can be formed while separate sources of other materials, such as binders, flavors etc. are also sprayed onto the receiving surface. The composite mat can then be removed from the receiving surface to yield the final product in one operation.

The process of the prior art mentioned above still requires a broad pH range, in which the purified starting protein, which is first rendered alkaline, should be successively acidified to coagulate and form fibers from the solution mentioned above, although the mat of protein fibers is conceivably constructed in one operation.

The present inventors have obtained, in the course of their research, experimental evidence which makes it possible to construct a novel fabricating process to improve the prior art process as described above, with special reference to the specific phenomenon related to the coagulation which is brought about within the short lapse of time immediately after the pH adjusted protein slurry having just completed the simultaneous flowing and heating procedure as described in the foregoing.

Specifically, as will be detailed hereinbelow, the novel manufacturing process of the present invention permits the two steps mentioned above to be accomplished in one operation and yet, the resultant sheet-like or block-like formation of the meat-like protein fibers of a condensed structural characteristics are advantageously obtained.

SUMMARY OF THE INVENTION

Accordingly, an essential object of the present invention is to provide a process for manufacturing a meat-like block or sheet of protein fibers, which can be accomplished in one operation, from a starting protein slurry and which does not include a procedure for acidifying the starting protein slurry.

Another important object of the present invention is to provide a process for manufacturing a meat-like block or sheet of protein fibers of the above described type, wherein the resultant meat-like block or sheet of protein fibers provides the sensation and taste to the mouth comparable to that provided by a natural meat.

A further object of the present invention is to provide a process for manufacturing a meat-like block or sheet of protein fibers of the above described type, wherein the desirable meat-like block or sheet of protein fibers having a predetermined size can be manufactured at low cost.

In accomplishing these and other objects according to one preferred embodiment of the present invention, there is provided a process for manufacturing a meat-like block or sheet of protein fibers, which comprises the following procedures: forcing a protein slurry having an optimum pH, which is approximately equivalent to the specific isoelectric point of protein contained therein, to flow through means provided with heating provisions, such as a heat exchanger of tubular type, to cause the protein slurry to be mutually mixed and heated therein simultaneously; discharging the protein slurry, treated as mentioned above, from the means in a dispersed condition thereof; and accumulating the dispersed protein slurry on a belt having a receiving surface of wire fabric within a short lapse of time before a specific coagulation thereof is completed, with the watery portion thereof being easily drained when the protein dispersed slurry dispersed is accumulated.

More specifically, the protein slurry to be prepared further has a solids concentration of 5 to 35 percent while the relative proportion of the protein to the solids in the protein slurry is set to be more than 60 percent.

Furthermore, a flow rate of the protein slurry forced to flow through the means mentioned above is more than 0.3 m/sec while the protein slurry is heated up to a temperature in the range of 105° to 160° C. before it is atomized, and thereby discharged to form the layer having a thickness less than 5 cm.

By processing as described in the foregoing, the formation of protein fibers and the fabrication of the protein fibers thus obtained into the meat-like block or sheet of protein fibers is accomplished in one operation.

Furthermore, the conventional practice to acidify the alkaline protein is also dispensed with.

DETAILED DESCRIPTION OF THE INVENTION

According to the present invention, there is provided a process for manufacturing edible meat-like sheets or blocks of protein fibers which comprises the following procedures: a simultaneous forcing to flow under heating conditions a starting coagulable protein slurry which has been already adjusted for pH; a successive procedure for spraying the heated, flowing slurry mentioned above, in an atomized condition; and a subsequent procedure to allow the resultant atomized substances to be aggregated and layered under conditions such that the watery portion thereof is freely drained, before the completion of solidification of the substance, in an apparently fibrous coagulation.

The utilization of the pH adjusted protein slurry so as to allow the substance, which is to be formed in an apparently fibrous coagulation, to be easily coagulable through the successive simultaneous accomplishment of forcible flow or more specifically, mutual, intimate contacts and heating treatment thereof mentioned above, is already well known in the prior art.

More specifically, the pH of the protein slurry is conventionally chosen in a manner such that the protein contained may be most favorably coagulated, and which pH generally exists at a pH which is approximately equivalent to the isoelectric point of the respective proteins to be treated.

However, a pH which is greater than or equal to the isoelectric point is ordinarily employed for manufacturing simulated meat products with many kinds of the protein source materials so that the resultant products may impart soft sensation to the mouth. For example, the favorable pH for soy protein to allow the protein content to be coagulated as protein fibers, exists at a pH of from 4 to 6, while the favorable pH for imparting desirable sensation to the mouth exists at a pH of from 4.5 to 5.5.

However, when the protein slurry contains therein metallic salts or hydroxides of substances having two or three valences such as calcium, magnesium, aluminum, or the like, the protein molecules constituting the protein slurry are apt to be easily coagulated and thereby, the pH of the slurry can be adjustable within a little wider range described above, since the cross-linkable effects associated with the protein molecules are quite accelerated by the existence of the substances mentioned above.

The protein molecules contained in the protein slurry having either a quite high or low pH when compared with the isoelectric point of the specific protein molecule mentioned above will experience the drawing or stretching phenomenon thereof through the simultaneous accomplishment of forcible flow and heating treatment of the protein slurry, while the of the coagulation substance sought to be coagulated as protein fibers is not brought about.

As for the protein source materials ready for the starting protein slurry mentioned above, casein, various kinds of the oilseed proteins obtained from, for example, soybeans, the seeds of cotton-plant or peanuts, and their combinations with animal meat protein or poultry meat protein, fish protein, microbic protein, wheat protein and the like, are preferably employed.

According to the present invention, the desired solids concentration of the protein slurry ranges from 5 to 35 percent and yet, the most favorable concentration thereof ranges from 15 to 25 percent, while the relative proportion of the protein content to the solids content or the protein content on dry basis should be kept at more than 60 percent. The proportional limitation of the solids content to the protein content or the solids content on a dry basis is derived from the fact that an excessively low, relative solids contents on dry basis brings about undesirable processing efficiency with the watery content of the resultant fibrous coagulant being relatively high.

Furthermore, when the solids percentage mentioned above is less than 5 percent, the subsequent discharging procedure thereof becomes difficult to perform and further, the coagulation of the substance which is to be formed in an apparently fibrous coagulation occurs with difficulty, presumably because of the lack of mutual intertwining or physical or chemical reaction between the protein molecules unfolded during the forcible flow thereof under heating conditions. Contrary to the situation mentioned above, when the solids percentage is more than 35 percent, the diameter of the threads of the fibrous substance tends to become thicker and yet, the procedure for forcing the protein slurry to flow also tends to become difficult.

More specifically, when the protein content on a dry basis is less than 60 percent, the fibrous formation of the protein becomes less effective. This may partially depend upon the fact that the concentration of the protein itself becomes sparse and thereby, the mutual, intimate contacts of the protein molecules with each other may be limited.

The protein slurry may be blended with edible oil, saccharoid, emulsifier, phosphate, seasoning materials, flavors, coloring agents, and other additives. Especially, the addition of edible oil is effective for further improvement of taste and feel imparted to the mouth, while the addition of saccharoid and polyvalent alcohol etc. is effective to allow the physical and chemical properties of the products manufactured to be maintained unchanged when the products are stored under conditions of low humidity. Furthermore, the addition of phosphate is also effective for further improvement of soft and supple feel imparted to the mouth.

The protein slurry thus prepared is forced to flow in a heated condition and is successively ejected in an atomized condition so that the desired product is formed in an apparently fibrous coagulation.

The complete mechanism of the generation of the fiber-like coagulation as the result of the series of steps mentioned above has not still been made clear. However, the heat treatment of the protein slurry perhaps promotes the hydration of the protein molecule and, causes the nature of the globular protein to be changed into a transformable one. Therefore, the simultaneous performance of the forcible flow procedure with the heating procedure causes the respective globular proteins to assume a transformable nature whereby they are first untied from the connections therebetween and are subsequently drawn or unfolded in a direction of flow thereof.

The coagulation in fibrous form proceeds as a result of reacting or intertwining unfolded molecules which contact each other in their direction of flow. Forcing the slurry through a converging area of appropriate cross-section and keeping the slurry in an appropriate turbulent condition promotes such contact, whereby protein fibers which are thick in diameter are produced. The pH of the starting solution mentioned above also affects the diameter of the protein fibers.

However, since the present invention only intends to fabricate the meat-like protein fibers, the independent protein fiber need not necessarily impart a sensation in the mouth comparable to that of the natural meat, as may be expected in conventional practice.

This depends upon the fact that the dense composite or cluster of protein fibers can give a much preferable meat-like sensation to the mouth even when compared with the prior process whose independent protein fiber is intended to have the meat-like sensation.

Therefore, the apparent diameter of the respective protein fibers to be coagulated are to be preferably kept at less than 2 mm for promoting the mutual intertwining of the protein fibers with each other. The most preferable average diameter of the fiber coagulated is between 0.1 and 1.0 mm.

The protein slurry, which is being preferably heated and forced to flow in the process mentioned above, is subjected to the following operating conditions, wherein the temperature range thereof is from 105° to 160° C., and the flow rate (defined by the volume of the protein slurry forcibly flowing per unit time through a cross sectional area is more than 0.3 m/sec. If either the operating temperature or the velocity conditions are not satisfied and thereby, the respective operational limits mentioned above are either less than 105° C. or 0.3 m/sec, the resultant fibrous coagulation can not be fulfilled, while the excess heating of the protein slurry beyond the upper limitation of 160° C. brings about the hard browning of the resultant fibrous coagulations as well as the degradation of the protein concerned.

As for the method of heating the protein slurry, either direct heating with steam being injected into the slurry, such as the ejector, or the indirect heating by utilizing conventional heating apparatus, such as a heat exchanger of the tubular type, a scraped surface heat exchanger, or the like may be applied. The adjustment of the diameter of the fibrous coagulation is accomplished by the adjustment of the operational parameters as well as the process apparatus parameters such as the solids proportion in the protein slurry, the distance required for the forcible flow of the protein slurry, the fluid velocity, the converging ratio of the portion having the reduced dimensions, the degree of the turbulence concerning the protein slurry, and the like.

Generally, the relatively small solids contents in the protein slurry, the reduction of the distance required for the forcible flow of the protein slurry, the omission of the converging portion in a flow provision, the higher fluid velocity of the protein slurry as well as the lower degree of the turbulence concerning the protein slurry processed, respectively allow the apparent dimensions of the protein fiber to become smaller.

According to present invention, the spraying of the protein slurry and the formation of the meat-like mat or block of the protein fibers are to be simultaneously accomplished in one operation, and hence, the conditions to be satisfied for accomplishing these procedures mentioned above are as follows: (1) the protein slurry must be sprayed after forcibly flowing, for example through a heat-exchanger, in an atomized condition; (2) the protein slurry sprayed in the atomized condition must be successively aggregated and accumulated under conditions such that the watery portion thereof easily flows out of the accumulated layer; (3) the accumulating procedure of the atomized substances for respective runs must be completed, before the substance which is to be formed in an apparently fibrous coagulation is solidified or coagulated on a receiver or the like.

Unsatisfactory accomplishment concerning even one of these conditions mentioned above in the embodiment of the present invention will result in process failure, wherein the protein fibers can be neither intimately intertwined, nor be further bound to provide a well condensed mat or block of the protein fibers.

The efficient accomplishment of spraying the process protein slurry in the atomized condition is accordingly promoted as the heating temperature or the internal pressure of the apparatus for forcing the protein slurry therethrough increases or the portion having the reduced dimensions or the converging portion mentioned above becomes narrower.

According to the present invention, the spraying of the protein slurry under the atomized condition is arranged to be forced by the specific fluid pressure of the system itself or the specific flux of the forcible flow of the protein slurry, and thereby the additional external force can be further utilized for the atomizing purposes mentioned above.

Easy separation of the watery portion from the layer accumulated is one of the conditions for effectively accomplishing the present invention as mentioned in the foregoing. However, the word "watery portion" in the foregoing does not mean the water which is substantially contained in the substances to be coagulated (the constituent ordinarily occupies from 60 to 80 percent thereof), but the residual portion of the protein slurry after the substances which are to be formed in an apparently fibrous coagulation has been removed.

The existence of watery portion of the protein slurry not only causes the substances sprayed and once received on the receiver to be again thrown in all directions, but also prevents the coagulation of the substance which is to be formed in an apparently fibrous coagulation and thus, the substance mentioned above will be left in the dispersed condition therein, even if the scattering of the substances mentioned above on the receiver is prevented by provisions such as side walls.

Therefore, the receiver mentioned above should be provided with a water-escape such as a water releasing portion thereof so that the watery portion once reached thereon may easily escape therefrom to avoid the occurrence of the defects mentioned above.

If the receiver mainly comprises the receiving portion of wire fabrics, the sliding resistance will preferably become large enough to prevent the substances sprayed at a conventional speed and received on the receiver from further scattering, and to permit the substances to be easily composed thereon.

The atomized substances may accumulate in excess thickness due to the presence of a watery portion therein. This also causes the respective layers to be readily separable. Accordingly, the accumulated thickness is thus preferably ketp at less than 5 cm.

If the receiver comprises such a type of device with the wire fabric receiving portion travelling at a predetermined speed and further equipped with scrapers, for example, a conveyer or a rotary drum provided with the abovementioned provisions, the substances, received on the receiver mentioned above and thereby accumulated, can be composite as a mat- or sheet-like substances having a predetermined thickness. Therefore, according to the process mentioned above, the travelling speed of the receiver can be the only operational parameter for controlling the thickness of the composite substances on the receiver. The composite substances mentioned above can be further cut into portions respectively having a predetermined length in succession, whereby the meat-like blocks of protein fibers having predetermined thickness and length can be effectively, continuously manufactured.

As may be clear from the manufacturing and fabricating process mentioned in the foregoing, the configurations of the outlet or the forward end of the area for forcible flow of the protein slurry should be formed in a slender rectangular cross section rather than a circular cross section to cause the protein slurry to accumulate in a predetermined thickness on the receiver of the above described type. If the substances to be sprayed in the atomized condition are arranged to be successively accumulated within respective predetermined short distances on the receiver along the travelling direction of the receiver, which arrangement may be possible when the spraying procedure of the protein slurry is accomplished in an intermittent manner, the respective orientations of the fibers comprising the meat-like block of protein fibers thus fabricated tend to be well defined in a direction perpendicular to the travelling mentioned above, thereby permitting fabrication in a fibrous structure similar to that of the fibrous protein.

Therefore, the meat-like block of protein fibers mentioned above may impart a sensation to the mouth similar to that of natural meat, which feel may be further improved if the respective diameters of the fibers are arranged to be a little thicker (almost more than 0.7 mm.)

Completion of the solidification of the substances to be formed in an apparently fibrous configuration, refers to the coagulating characteristics of the substances mentioned above, and more specifically, the phenomenon in which the binding property of the substances to be formed in an apparently fibrous configuration is lost within the short time immediately after the substances mentioned above have been dispersed, following the coagulation process mentioned above.

Therefore, the atomized substances must be arranged to be aggregated and accumulated on the receiver to form a layer having a predetermined thickness before the coagulation of the substances is completed. For the purpose mentioned above, the distance between the location of the exit of the area for forcible flow of protein slurry and the position for accumulating the atomized protein slurry on the receiver is arranged to be as short as possible. Although the distance mentioned above is variable, depending upon the fabricating condition of the meat-like block of protein fibers such as the scale of the provisions and the space velocity etc., the preferable range thereof is normally designated to be within 5 to 50 cm.

If the temperature of the surroundings associated with the distance mentioned above is effectively maintained to maintain the specific temperature of the substance just discharged, the distance mentioned above may be a little longer but must be adjusted so as not to reduce the possibility of the occurrence of intertwining of the protein fibers with each other.

By the processing as described in the foregoing, simultaneous accomplishment of the formation of protein fibers and the fabrication of the protein fibers thus obtained into the meat-like block of the protein fibers in one operation makes it possible to manufacture a condensed composite meat-like food material of protein fibers without atomizing any kind of binder.

The products produced by the present invention, which are either to be immersed in a pH adjuster or to be seasoned with seasoning agents or to be cut in a predetermined size or to be properly cooked, depending upon the necessity, are utilized as the simulated meat for manufacturing the various kinds of meat and fish products such as cutlets, beef boiled in soy sauce, canned foods, roast beef and dehydrated meat.

The process of the present invention will be made apparent from the following examples which are chosen from may specific combinations possible to illustrate the invention, without any intention of limiting the scope thereof.

EXAMPLE 1

The starting protein slurry of pH 5 having a solids content of 20 percent and relative proportional protein content of 93 percent on the basis mentioned above was prepared through a procedure, in which the protein was extracted from a solution mixture comprising one part of the lower temperature extracted, defatted soybean (the defatted soybean having low denaturation of protein characteristics) and ten parts of dilute alkaline solution with the residue thereof being removed, and the resultant curd, made from the protein mentioned above, and having an acid solution subsequently added thereto, was washed twice and dehydrated.

The starting protein slurry thus obtained was forced through a tubular type heat exchanger comprising a coiled tube of an inner diameter of 4 mm and a total length of 17 m at a fluid velocity of 3 m/sec with simultaneous indirect heat-exchanging by the heating medium of the steam having the gage pressure of 5 kg/cm$^2$.

The protein slurry was successively sprayed in an atomized condition into the atmosphere through the forward end of the coiled tube specially deformed so as to have a cross sectional area of 1 mm by 5 mm, and thereby, the dispersed protein was accumulated on the belt of wire fabric of 30 mesh, which was located at the position spaced from the exit mentioned above by 15 cm and travelling at a speed of 5 cm/sec.

By the process arrangement mentioned in the foregoing, the resultant meat-like sheet of protein fibers (the average diameter of the respective protein fibers constituting the block mentioned above was 0.3 mm) had a width of 10 cm and a thickness of 3 mm. Furthermore, the abovementioned meat-like block of protein fibers was fried to provide cutlets after a series of treatments as follows; the block of protein fibers was cut into an appropriate size of 5 cm by 10 cm, and the pieces obtained in the manner as described above were immersed into a mixture of seasoning agents mentioned hereinbelow for about 10 minutes, followed by battering and breading.

The seasoning agents mixture mentioned above was composed of 80 parts of water, 5 parts of extract of beef, 2 parts of soy and a sweet kind of Japanese sake respectively, one part of sugar and caramel respectively, and one part of flavoring agents including sodium carbonate, monosodium glutamate, and various kinds of flavoring materials.

The resultant cutlets thus cooked imparted a desirable sensation to the mouth as if they contained natural meet.

EXAMPLE 2

Meat-like block of protein fibers having an average diameter of 1.2 mm respectively was prepared in a manner similar to EXAMPLE 1 except that the length of the coiled tube was altered to be 34 m.

Although the resultant meat-like block showed less condensed constructional characteristics than that obtained in EXAMPLE 1, the protein fibers constituting the meat-like block were intertwined very closely with each other.

EXAMPLE 3

The meat-like block of protein fibers was manufactured under conditions such that the travelling speed of the belt was 2 m/sec, with all other conditions being kept the same as in EXAMPLE 1 mentioned above. The resultant meat-like block had dimensions of 10 cm in width and 7 cm in thickness.

Comparative data 1

The respective processing steps for manufacturing the meat-like block of protein fibers under the same conditions as indicated in EXAMPLE 1 were followed except for the location of the belt of wire fabrics for accumulation having been either 4 cm or 60 cm from the position of the forward end of the coiled tube. The following results were obtained.

According to the former arrangement mentioned above, the dispersed substances were scattered at the receiver in a manner mentioned earlier, and thereby, the coagulation was not brought about on the receiver. In the latter arrangement mentioned above, not only the mutual intertwining, but also the mutual binding of the resultant protein fibers in the block turned out to be quite weak.

Comparative data 2

Processing for manufacturing the meat-like block of protein fibers under the same conditions as indicated in EXAMPLE 1 except for the belt for accumulation of the atomized substances having been made of stainless steel, provided the defective results, in which the dispersed substances failed to become aggregated and accumulated and thereby, the coagulation thereof was not brought about.

EXAMPLE 4

The curd, having been processed in the same manner as described in the EXAMPLE 1 and washed once before dehydration thereof, had added thereto the lower temperature extracted, defatted soybean and water in order to obtain the protein slurry of pH 4.6 with solids contents being 25 percent and the relative content of the protein to the solids content being 70 percent.

By processing the protein slurry mentioned above in the same manner as described in EXAMPLE 1, the meat-like block of protein fibers, whose average diameter was 0.4 mm, was obtained.

The protein product thus obtained imparted a somewhat soft sensation to the mouth when compared to that obtained by the process mentioned in the EXAMPLE 1.

EXAMPLE 5

The protein slurry of the same properties as that of EXAMPLE 1, which was fed under pressure into a pipe having an inner diameter of 4 mm, with the forward end thereof deformed in a cross section of 1 mm by 4 mm, was successively steamed by means of a steam injector, until the protein slurry was successively sprayed in an atomized condition into the atmosphere at the forward deformed end mentioned above, wherein the distance between the introducing position of steam by means of the injector into the tube and the forward end of the pipe mentioned above was 4 m and temperature of the protein slurry was arranged to be 120° C. at the exit.

The atomized substances of an exit temperature of 120° C. were accumulated on a belt with a portion of wire fabric of 30 mesh having travelled at a speed of 1 m/sec, to obtain the meat-like block of protein fibers.

EXAMPLE 6

The curd, having been similarly processed as described in EXAMPLE 1 and successively washed twice before dehydration thereof, was mixed with fish meat paste from the lean of the tuna. The curd and the paste mentioned above were mixed at a ratio of 70 to 30 based on the respective watery portions therein.

The resultant protein slurry having a pH of 5.0, and being composed of solids content of 20 percent was treated in the same way as in EXAMPLE 1 to obtain a meat-like sheet of protein fibers of 12 mm in width, except that the travelling speed of the belt of wire fabric was 1 cm/sec.

Subsequently, the meat-like mat or sheet of protein fibers was treated in the following treatments in succession to provide the cubic preserved food boiled in soy and flavoring agents, i.e., the resultant meat-like mat or sheet was cut in cubes of 12 mm square to assume a dice-like form and which were subsequently boiled in seasoning agents composed of an extract of tuna, sugar, soy, caramel, and the like.

The resultant cube-like preserved food boiled in soy and flavoring agents was forcibly dried by means of a forced dehumidifying process to obtain the cube-shaped snack food of delicate flavor almost close to tuna meat.

Both simulated food material mentioned above not only imparted a sensation to the mouth comparable to the natural meat, especially in the hardness concerning the fibers thereof, but also kept the pleasing flavor and taste of tuna in one's mouth due to the fact that the tuna flavor was maintained fixedly to the respective fibers of the meat-like block of protein fibers. This was due to the process characteristics of the blending of fish meat paste with the protein slurry and successive series of heating and solidifying processes to produce a simulated food, which when boiled in soy and flavoring agents had a delicate flavor.

Although the present invention has been fully described by way of examples, it is to be noted that various changes and modifications are apparent to those skilled in the art. Therefore, unless otherwise such changes and modifications depart from the scope of the invention, they should be construed as included therein.

What is claimed is:

1. A process for manufacturing a meat-like block or sheet of protein fibers, which consists of the steps of forcing a coagulable protein slurry to flow in a heated condition and subsequently spraying said heated, flowing slurry in an atomized condition onto a water-drainable receiver within a specific period of time before a specific coagulation thereof so that said protein slurry spray accumulates before said specific coagulation is completed, the solids concentration of said coagulable protein slurry being 5 to 35 percent with the relative proportion of protein to said solids in said coagulable protein slurry being more than 60 percent, the rate at which said coagulable protein slurry is forced to flow being more than 0.3 m/sec, and the temperature of said heated coagulable protein slurry being 105° to 160° C.

2. A process for manufacturing a meat-like block or sheet of protein fibers as claimed in claim 1, wherein the pH of said coagulable protein slurry to be treated is approximately equivalent to the specific isoelectric point of protein contained therein.

3. A process for manufacturing a meat-like block or sheet of protein fibers as claimed in claim 2, wherein the solids concentration of said coagulable protein slurry is 15 to 25 percent.

4. A process for manufacturing a meat-like block or sheet of protein fibers as claimed in claim 1, wherein the average diameter of said protein fibers is less than 2 mm.

5. A process for manufacturing a meat-like block or sheet of protein fibers as claimed in claim 1, wherein said process further comprises a step of causing said coagulable protein slurry to flow through an area of converging diameter before said protein slurry is sprayed.

6. A process for manufacturing a meat-like block or sheet of protein fibers as claimed in claim 1, wherein said protein slurry spray is accumulated on a travelling belt having a receiving surface of wire fabric.

7. A process for manufacturing a meat-like block or sheet of protein fibers as claimed in claim 6, wherein the accumulated thickness of said protein slurry spray is less than 5 cm.

8. A process for manufacturing a meat-like block or sheet of protein fibers as claimed in claim 7, wherein said coagulable protein slurry is sprayed in an intermittent manner so that respective protein fibers to be accumulated tend to be well oriented in a direction perpendicular to the direction of travel of said belt.

* * * * *